United States Patent

Huang et al.

[11] Patent Number: 5,177,523
[45] Date of Patent: Jan. 5, 1993

[54] AUTOMATIC INSTANT FOCUSING AND EXPOSING MECHANISM FOR PHOTOGRAPHIC APPARATUS

[75] Inventors: Tsai-Jeon Huang; Yee-Haur Chiou; Chen-Chin Cheng, all of Hsinchu, Taiwan

[73] Assignee: Industrial Technology Research Institute, Taiwan

[21] Appl. No.: 789,864

[22] Filed: Nov. 12, 1991

[51] Int. Cl.⁵ .......................... G03B 3/10; G03B 9/22
[52] U.S. Cl. .................................. 354/400; 354/439; 354/234.1; 354/195.1
[58] Field of Search ..................... 354/400, 439, 234.1, 354/266, 195.1

[56] References Cited

U.S. PATENT DOCUMENTS

| | | | |
|---|---|---|---|
| 4.881.096 | 11/1989 | Ogihara et al. | 354/400 |
| 5.047.796 | 9/1991 | Tagami et al. | 354/400 |
| 5.060.000 | 10/1991 | Ogihara et al. | 354/400 |

Primary Examiner—Michael L. Gellner
Assistant Examiner—Jae N. Noh
Attorney, Agent, or Firm—Cushman, Darby & Cushman

[57] ABSTRACT

An improved mechanism for cameras includes a solenoid which drives a cam ring to rotate to a control position for focusing or exposing; a motor drives a planetary gear set which includes a swing arm with a pinion fixed thereon. When the cam ring is in the control position for focusing, the pinion transmits the power generated by the motor to the teeth of the focusing ring to cause the focusing ring to rotate and focus. When the cam ring is in the control position of exposing, the pinion disengages from the teeth of the focusing ring to engage with the internal gear of the planetary gear set to cause the swing arm to oscillate and thereby actuate the shutter mechanism. At this time, the cam ring also initiates the movement of a ratchet set so that the focusing ring cannot move freely during the exposure process.

8 Claims, 6 Drawing Sheets

AUTOMATIC INSTANT FOCUSING AND EXPOSING MECHANISM FOR PHOTOGRAPHIC APPARATUS

BACKGROUND OF THE INVENTION

The present invention relates generally to an automatic focusing and exposing mechanism for photographic apparatuses, and more particularly to an improved mechanism for instantly completing both focusing and exposing operations when photographing fast moving objects: this mechanism also improves the operation sequence of focusing and exposing.

Prior art which teaches automatic focusing and exposing is as shown in FIGS. 1 and 2. According to the operation sequence of the prior art, a motor drives a range ring 1 to rotate in a counter-clockwise direction to initiate the focusing operation, a locking member 11 locks the range ring 1 so that it cannot move freely. When the locking member 11 releases the range ring 1, the motor starts reverse rotation, driving the range ring 1 to rotate in a clockwise direction and to urge against the shutter lever 12 for exposure. The motor then drives the range ring 1 to rotate counter-clockwisely to return to its original position.

The above-described prior art has to utilize the range ring 1 to rotate first counter-clockwisely so as to focus, and then clockwisely so as to actuate the shutter mechanism. After that, the range ring 1 has to rotate counter-clockwisely again to return to its original position. As can be seen, the whole process from focusing to exposure is quite long, and hence the cycle for completing both operations of focusing and exposing is very long. There is another kind of prior art which improves upon the drawbacks in the above-described known art. The Konica camera is herein taken as a typical example. The Konica camera uses two motors as power sources, one for focusing, the other for actuating the shutter; but this configuration is complex and costly. As regards the control of the motors, it requires precise control and is therefore not very satisfactory.

SUMMARY OF THE INVENTION

In view of the aforesaid drawbacks in prior art, it is a primary object of the present invention to provide a mechanism whereby only one motor is required to instantly complete both focusing and exposing operations for a photographic apparatus.

It is another object of the present invention to provide an automatic focusing and exposing mechanism for a photographic apparatus whereby a new operation sequence for automatic focusing and exposing is established to reduce the time required for one operation cycle.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENTS

Figure 2:
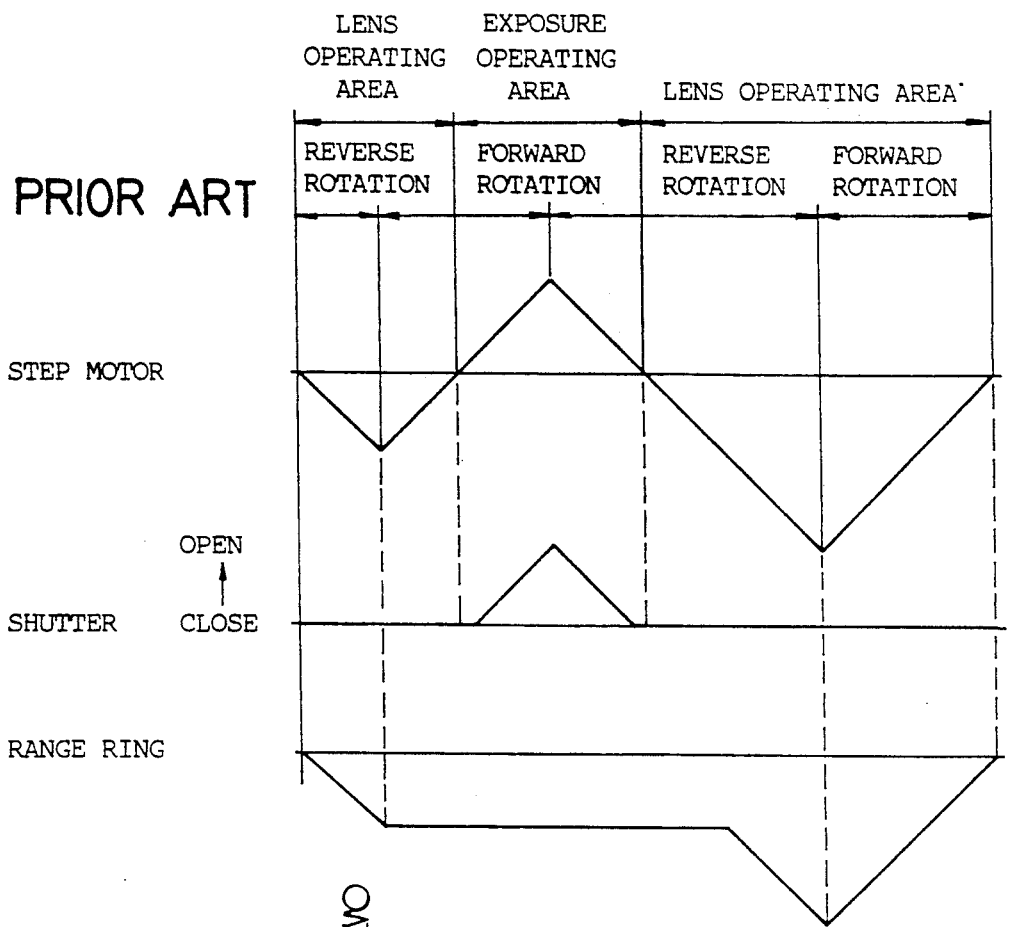
FIG. 2 is an operation sequence diagram of the prior art.
Figure 1:
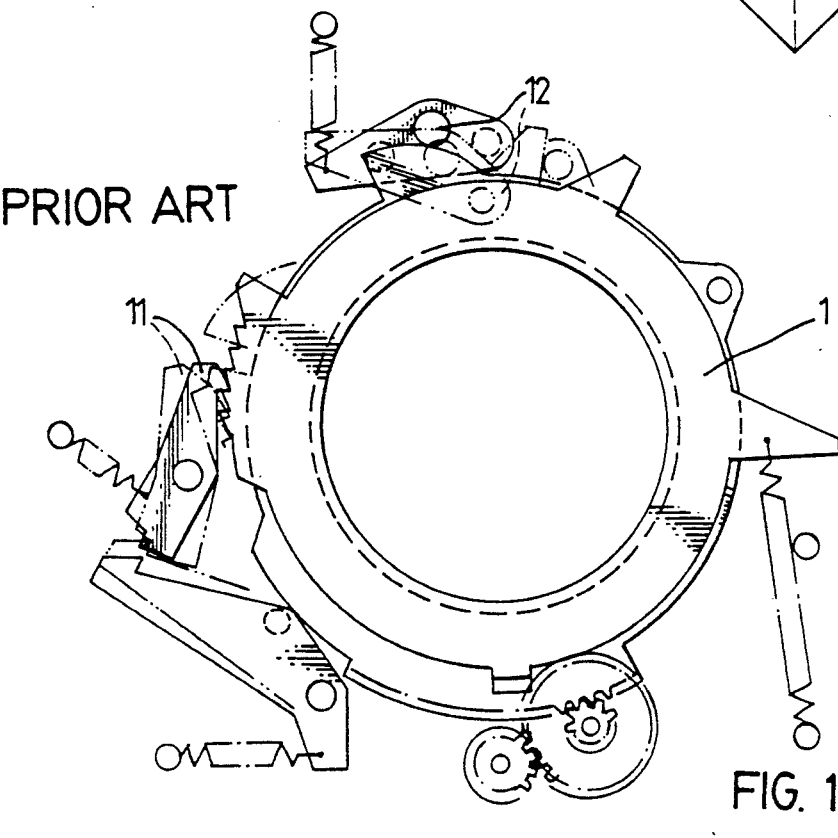
FIG. 1 is a plan view of the prior art, the dotted lines showing the movement of action of the main components.
Figure 3:
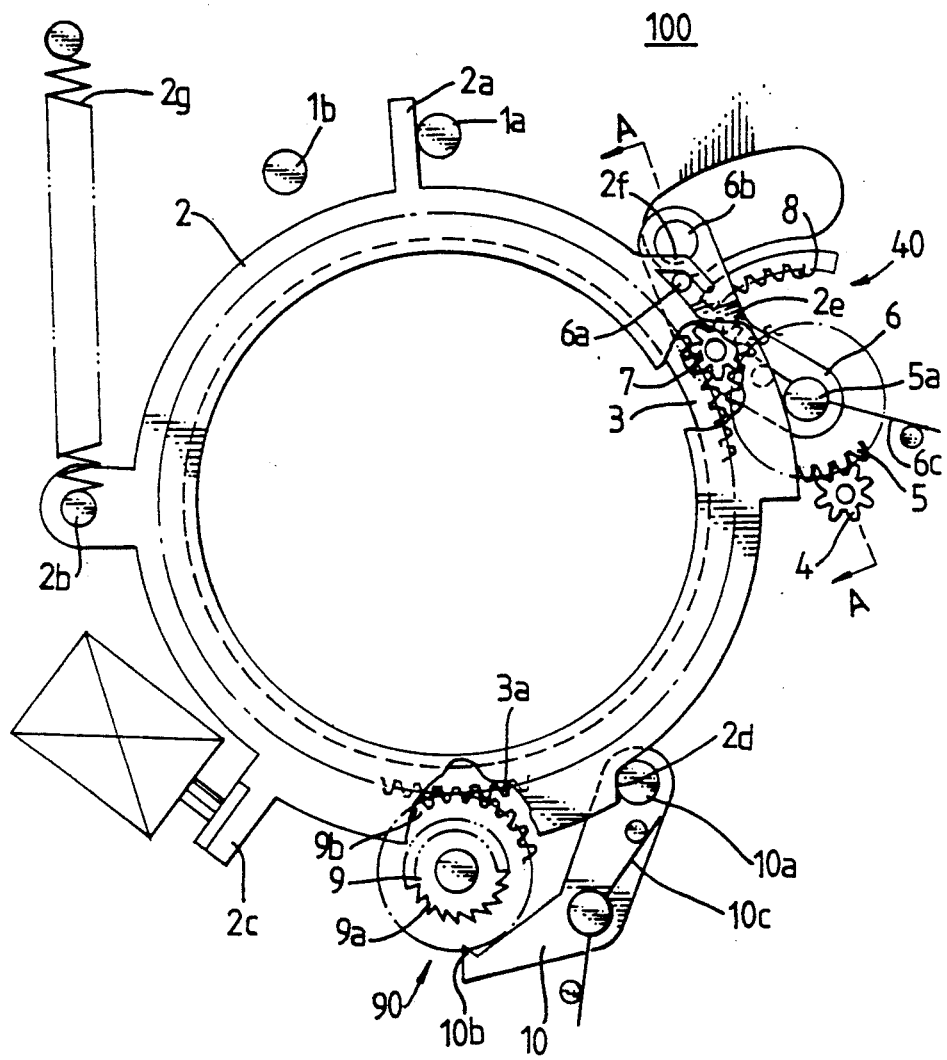
FIG. 3 is a plan view of an embodiment of the present invention.
Figure 4A:
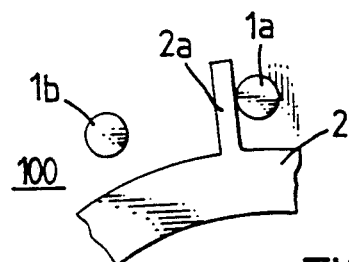
FIGS. 4A and 4B are plan views of the cam ring according to the embodiment of the present invention.
Figure 4B:
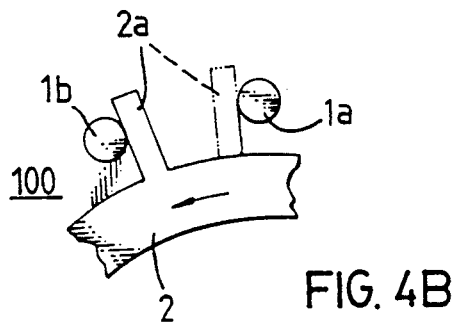
Figure 5:
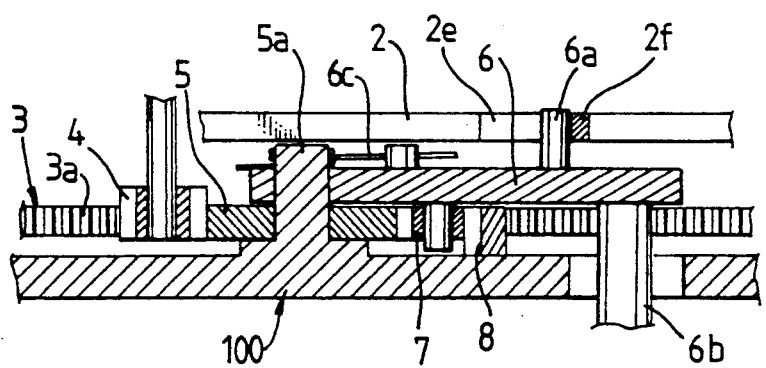
FIG. 5 is a sectional view taken along line A—A of FIG. 3.

As shown in FIG. 3, the mechanism of the present invention is achieved chiefly by means of a cam ring 2 which is pivotally provided on a base 100 and controls the position of cams to generate sequential actions. A solenoid 20 fixed onto the base 100 urges against a push end 2c of the cam ring 2 so that the cam ring 2 rotates to a focusing position or an exposing position. As shown in FIGS. 3, 4A, and 4B, the upper part of the cam ring 2 is provided with a projecting rod 2a. When a camera is being assembled, the projecting rod 2a is positioned between two pins 1a and 1b which are provided on the base 100. These pins 1a and 1b limit the rotation angle of the cam ring 2. When the projecting rod 2a touches the pin 1a, as shown in FIG. 4A, the cam ring 2 is in a focusing position; when the projection rod 2a moves from the focusing position to where it touches the pin 1b, as shown in FIG. 4B, the cam ring 2 is in an exposing position.

Figure 6A:
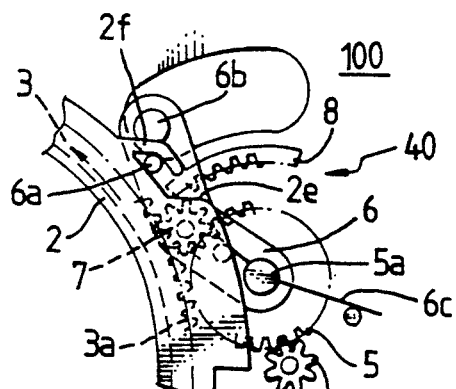
FIGS. 6A, 6B, and 6C are plan views of the planetary gear set according to the embodiment of the present invention; each showing a different position of the cam ring during the focusing or exposing operation.
Figure 6B:
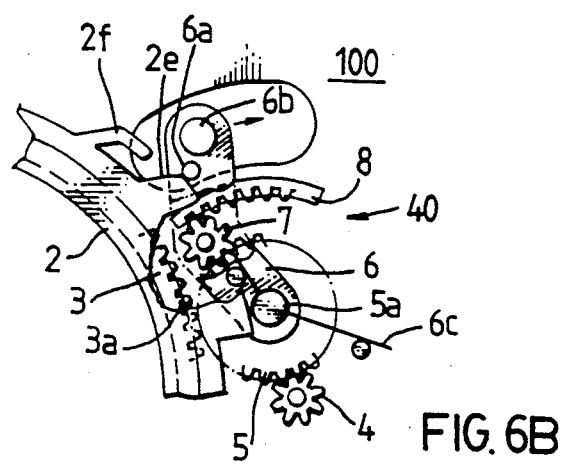
Figure 6C:
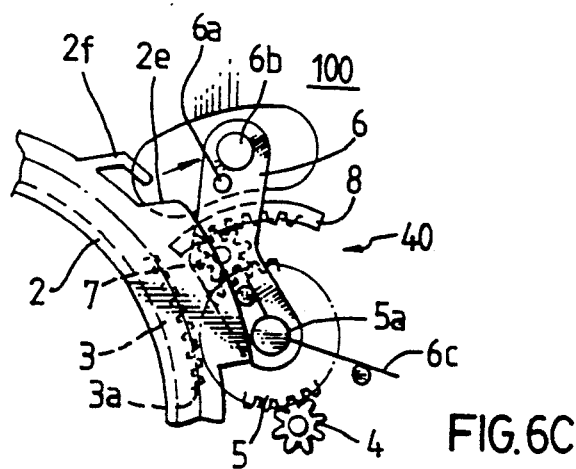

As shown in FIGS. 3, 6A, 6B, and 6C, a planetary gear set 40 to the right of the cam ring 2 controls the focusing and exposing operations, wherein a motor, as a power source, drives a gear 4 and, via the transmission of an idle gear 5 which is pivotally provided on the base 100, actuates a focusing ring 3 which is pivotally provided on the base 100 and is coaxial with the cam ring 2 to perform focusing operations when a pinion 7 engages with a plurality of teeth 3a provided at the periphery of the focusing ring 3, as shown in FIG. 6A. The above-mentioned pinion 7 engages with an internal gear 8 of the planetary gear set 40 to actuate the oscillation of a swing arm 6 so as to perform exposing operations, as shown in FIGS. 6B and 6C. The internal gear 8 of the planetary gear set 40 is a section taken from a ring-shape internal gear fixed onto the base 100, the ring-shape internal gear being coaxial with the above-mentioned idle gear 5.

As shown in FIG. 3, a resilient member 2g which is generally an extension spring is provided at the left side of the cam ring 2. One end of the resilient member 2g is fixed onto the base 100 with the other end hooked to a pin 2b of the cam ring 2, so that when the solenoid 20 is inactive, the resilient member 2g automatically pulls the cam ring 2 to rotate clockwisely back to its original position, until the projecting rod 2a touches the pin 1a. The cam ring 2 is provided with two cams, wherein the first cam 2d is next to a ratchet set 90 and controls whether a pawl 10 is to engage with a ratchet 9; the second cam 2c is next to the above-mentioned planetary gear set 40 and controls the pinion 7 which is pivotally disposed on the swing arm 6, so that when a hooking member 2f hooks a pin 6a, the pinion 7 is caused to engage with the teeth 3a of the focusing ring 3, and when the hooking member 2f releases the pin 6a, the pinion 7 is caused to engage with the internal gear 8 of the planetary gear set 40.

Figure 7A:
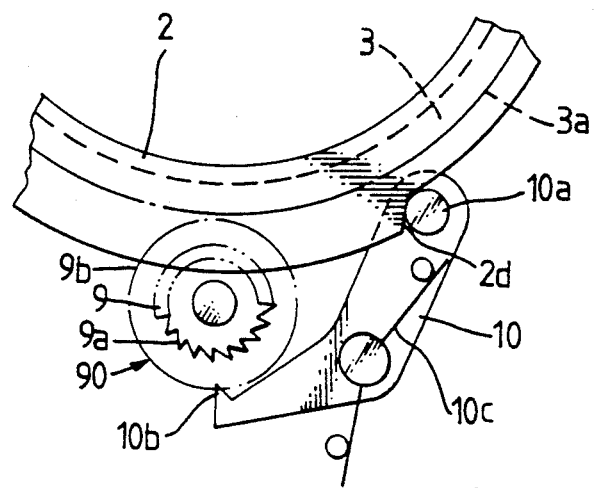
FIGS. 7A and 7B are plan views of the ratchet set according to the embodiment of the present invention, each showing a different action of the ratchet set.
Figure 7B:
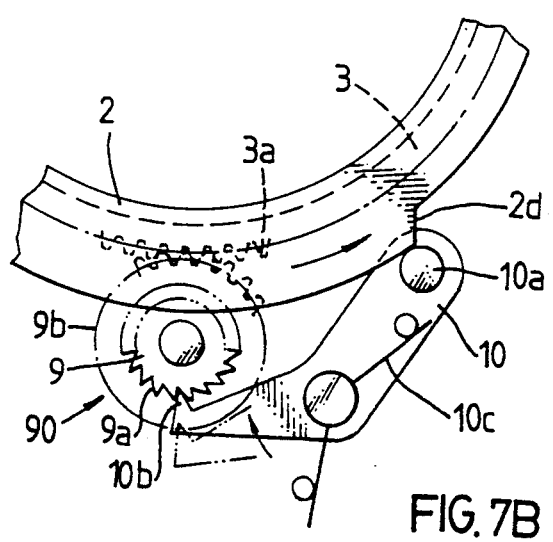

One end of the pawl 10 is provided with a pin 10a which is subject to the torsion force of a torsion spring 10c, so that the pin 10a frequently presses against the first cam 2d on the cam ring 2; a pawl portion 10b at the other end of the pawl 10, as shown in FIG. 7B, engages with the ratchet teeth 9a of the ratchet 9 when the first cam 2d urges against the pin 10a; a gear 9b which is coaxially fixed with the ratchet 9 engages with the teeth 3a of the focusing ring 3, so that when the focusing ring 3 completes the focusing operation, because the ratchet 9 is blocked by the ratchet teeth 9a so that it cannot rotate, the gear 9b which is coaxial with the ratchet 9 is also unable to rotate. Likewise, when the teeth 3a of the focusing ring 3 engage with the gear 9b, the focusing ring 3 is also unable to rotate; therefore, the focusing ring 3 is prevented from moving freely, unless the cam ring 2 rotates clockwisely to the position as shown in FIG. 7A to cause the pawl portion 10b of the pawl 10 to disengage from the ratchet 9.

One end of the swing arm 6 is pivotally disposed on a shaft 5a of the idle gear 5. The swing arm 6, subject to the torsion stress of the torsion spring 6c, forces a pin 6a on the swing arm 6 to press against the cam ring 2. The pinion 7 is pivotally disposed on the swing arm 6 to move therewith and to engage with the internal gear 8 and the idle gear 5 simultaneously. When moving, a pin 6b which is fixed on the swing arm 6 actuates the shutter.

The operation sequence of the components of the present invention is as follows:

(1) Focusing operation: The motor drives the gear 4 which, via the transmission of the idle gear 5, causes the pinion 7 to engage with the teeth 3a of the focusing ring 3 to initiate the rotation of the focusing ring 3, so that the circumferential movement of the focusing ring 3 may be changed to linear movement for focusing purposes. At this time, the solenoid 20 is inactive, and the cam ring 2 and the related components are therefore inactive.

(2) Exposing operation: After the completion of the above-described focusing operation, the solenoid 20 drives the cam ring 2 to rotate in a counter-clockwise direction. First of all, the first cam 2d pushes the pawl 10 of the ratchet set 90 to engage with the ratchet 9, as shown in FIG. 7B, so as to position the focusing ring 3. Then the second cam 2e pushes the pin 6a on the swing arm 6, so that the swing arm 6 swings to the right, as shown in FIG. 6B; the pinion 7 disengages from the teeth 3a of the focusing ring 3 to engage with the internal gear 8 of the planetary gear set 40. At this time, the motor continues to drive the gear 4 so that the pinion 7 rotates along the internal gear 8 to cause the swing arm 6 to oscillate, as shown in FIG. 6C, and because of the displacement of the pin 6b, the shutter mechanism is actuated.

At this time, if the focusing ring 3 is temporarily positioned and the motor is caused to rotate intermittently to drive the gear 4, then the swing arm 6 will oscillate to and fro and actuate the shutter a number of times, achieving the special effect of instaneous focusing and continuous photographing of fast moving objects. This feature of the present invention is not disclosed in any prior art.

(3) Returning: After the completion of the exposing operation, both the solenoid 20 and the motor stop action. Because the direction of tension generated by the above-mentioned resilient member 2g is opposite to the direction of movement generated by the solenoid 20, the cam ring 2 is subject to the tensional force of the resilient member 2g to rotate in a clockwise direction. The hooking member 2f provided on the cam ring 2 hooks the pin 6a on the swing arm 6 so that the pinion 7 again engages with the teeth 3a of the focusing ring 3. At this time, the pawl 10 is already disengaged from the ratchet 9; therefore, the focusing ring 3 is no longer restrained and is in a ready state for the next focusing operation.

Figure 8:
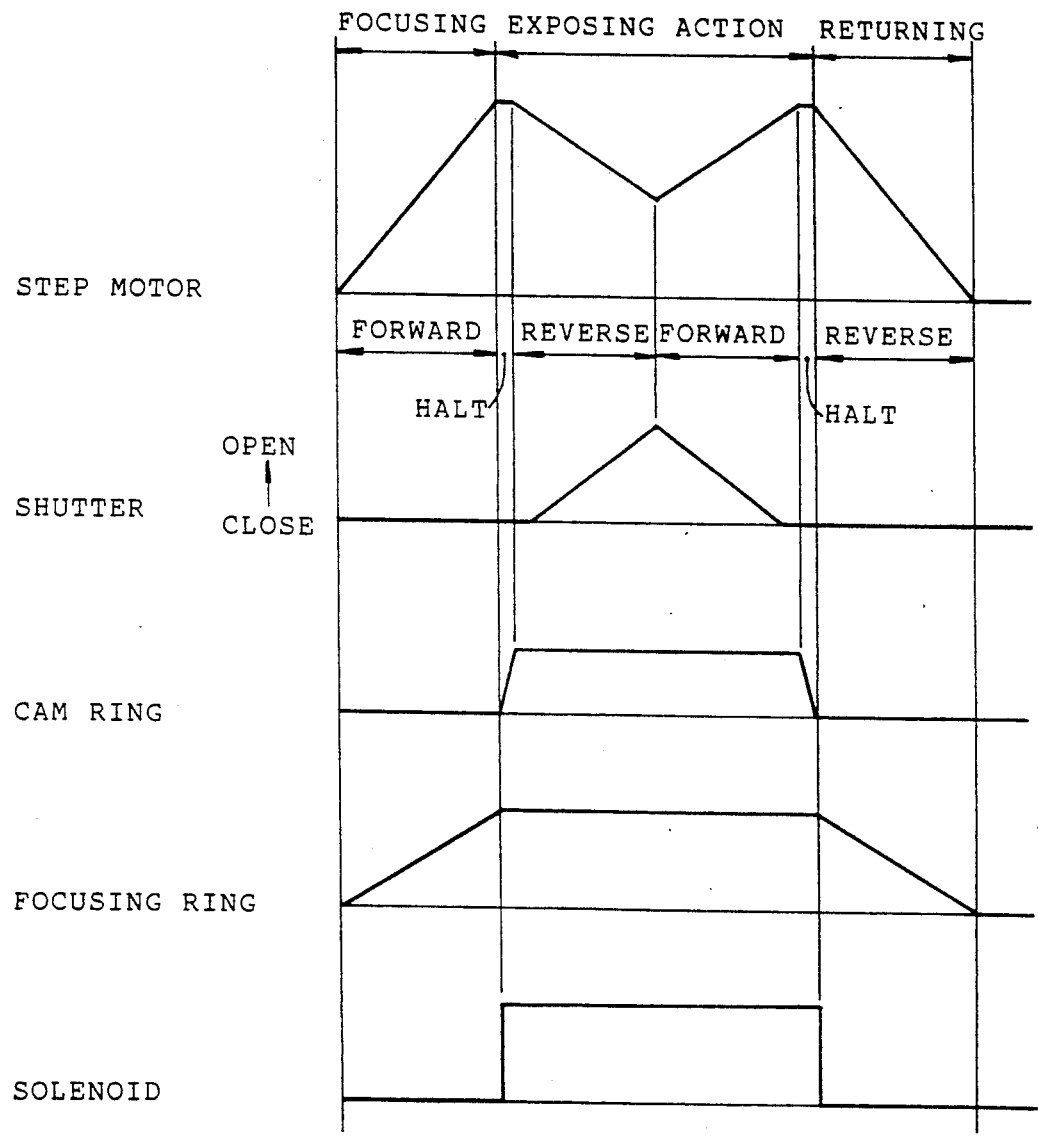
FIG. 8 is an operation sequence diagram of each component of the embodiment of the present invention.

FIG. 8 shows the operation sequence of the related components as described above. The operations according to the present invention are simple. While comparing the prior art with reference to the sequence diagrams, it is obvious that the present invention effectively reduces the time needed for one cycle of focusing, exposing, and returning. In FIG. 8, only one shutter operation is illustrated, but as a matter of fact, there may be more than one exposure in the comparatively longer exposure time domain. Furthermore, although the performance of the motor is not discussed in the above-described preferred embodiment, it does not matter whether a step motor or a direct current motor is used as the power source.

Although the present invention has been illustrated and described with reference to the preferred embodiments thereof, it should be understood that it is in no way limited to the details of such embodiments, but is capable of numerous modifications within the scope of the appended claims.

We claim:

1. An automatic instant focusing and exposing mechanism for photographic apparatuses, comprising:

a base having fixed thereon two pins and a resilient member;

a rotary focusing ring having a plurality of teeth at the periphery thereof and pivotally provided on said base;

a ratchet set comprising a ratchet, a gear, and a pawl which is pivotally disposed on said base, one end of said pawl being a pawl portion with the other end thereof having a pin;

a cam ring pivotally provided on said base and having a projecting rod, a first cam, a second cam, and a hooking member;

a solenoid fixed onto said base for driving said cam ring; and a planetary gear set comprising a motor driven gear, an idle gear pivotally disposed on said base, a section of a ring-shape internal gear provided on said base, a swing arm pivotally disposed on said base and having a pin, and a pinion pivotally disposed on said swing arm and engaging with said internal gear, wherein said motor drives said motor driven gear, and, via the transmission of said idle gear, said pinion is caused to engage with said teeth provided on said focusing ring, so that said focusing ring changes its circumferential movement to linear movement to actuate the focusing operation; at this time, said first cam urges against said pin on said pawl so that said pawl hooks said ratchet to fix a focusing position, said solenoid simultaneously drives said projecting rod on said cam ring to an exposing position, and said second cam urges against said pin on said swing arm to disengage from said hooking member on said cam ring, so that said pinion engages with said internal gear; said motor further drives said gear of said planetary gear set and, via the transmission of said idle gear and said pinion, causes said swing arm to oscillate so that said swing arm actuates a shutter mechanism.

2. A mechanism as in claim 1, wherein when said cam ring is in an exposing position, said pin on said swing arm disengages from said hooking member provided on said cam ring to cause said pinion to engage with said ring-shape internal gear.

3. A mechanism as in claim 1, wherein when said cam ring is in the focusing position, said hooking member hooks said pin on said swing arm to cause said pinion to engage with said teeth of said focusing ring.

4. A mechanism as in claim 1, wherein said resilient member has one end thereof fixed onto said base with the other end thereof fixed onto said cam ring, and the direction of stress generated by said resilient member is opposite to a direction of movement generated by said solenoid.

5. A mechanism as in claim 1, wherein said swing arm further comprises a second pin for actuating a camera shutter.

6. A mechanism as in claim 1, wherein said focusing ring and said cam ring are coaxial.

7. A mechanism as in claim 1, wherein said internal gear set and said idle gear are coaxial.

8. A mechanism as in claim 1, wherein said ratchet and said gear of said ratchet set are coaxial.

* * * * *